US012293643B2

(12) United States Patent
Lin

(10) Patent No.: US 12,293,643 B2
(45) Date of Patent: May 6, 2025

(54) CLAW CRANE STRUCTURE

(71) Applicant: Yi-Ho Lin, Kaohsiung (TW)

(72) Inventor: Yi-Ho Lin, Kaohsiung (TW)

( * ) Notice: Subject to any disclaimer, the term of this patent is extended or adjusted under 35 U.S.C. 154(b) by 550 days.

(21) Appl. No.: 17/730,206

(22) Filed: Apr. 27, 2022

(65) Prior Publication Data

US 2023/0316875 A1 Oct. 5, 2023

(30) Foreign Application Priority Data

Mar. 31, 2022 (TW) ................................ 111203261

(51) Int. Cl.
*G07F 17/32* (2006.01)
*A63F 9/30* (2006.01)

(52) U.S. Cl.
CPC ............ *G07F 17/3297* (2013.01); *A63F 9/30* (2013.01)

(58) Field of Classification Search
CPC ......... A63F 9/30; A63F 13/90; G07F 17/3297
See application file for complete search history.

(56) References Cited

U.S. PATENT DOCUMENTS

| | | | | |
|---|---|---|---|---|
| 9,898,885 B1 * | 2/2018 | Wang | .................. | G07F 17/3297 |
| 11,183,017 B1 * | 11/2021 | Tsai | .................... | G07F 17/3223 |
| 2016/0082345 A1 * | 3/2016 | Balaban | .............. | G07F 17/3218 273/448 |

FOREIGN PATENT DOCUMENTS

| | | | | | |
|---|---|---|---|---|---|
| CN | 111569407 A | * | 8/2020 | ............... | A63F 9/30 |
| GB | 2178328 A | * | 2/1987 | ............... | A63F 9/30 |
| TW | M630320 U | * | 8/2022 | ............... | A63F 9/30 |

* cited by examiner

*Primary Examiner* — Raleigh W Chiu
(74) *Attorney, Agent, or Firm* — Leong C. Lei

(57) ABSTRACT

A claw crane structure includes a main body a coil being provided therein, a bottom of the main body being provide with a clamping claw coupled pivotally to a standing tube extended inside the coil, allowing the clamping claw to be clamped inward or expanded outward according to the rise and fall of the standing tube inside the coil, characterized in that a PC circuit board relatively above the coil is provide on the main body, both ends of the coil are respectively in electric connection with two coil contacts provided on the PC circuit board; the main body further comprises a winding wire for provision of electric energy, two terminals thereof are similarly in electric connection with two winding wire contacts provided on the PC circuit board, each pair of the coil contact and winding wire contact are in electric connection with each other.

2 Claims, 3 Drawing Sheets

CLAW CRANE STRUCTURE

(a) TECHNICAL FIELD OF THE INVENTION

The present invention relates to a claw crane structure, and more particularly to a claw crane structure with an improved design for the connection between the coil and the winding wire of a claw crane of a crane game machine. The improved structure facilitates easier installation, maintenance, and replacement while reducing costs.

(b) BACKGROUND OF THE INVENTION

The current crane game machines (or claw machines, claw vending machines, etc.) both toy grabbing entertainment and commodity sales devices. People with all ages, including young children, students, professionals, and older individuals, can play these games to obtain prizes. Businesses also place special goods, limited items or other commodities inside crane game machines to attract players, enhance product value and popularity, and boost marketing effectiveness. As a result, crane game machines are widely enjoyed by the public and remain a popular form of entertainment and retail.

Currently, a claw crane in a crane game machine includes a main body 10 that houses a coil 11. At the bottom of the main body 10, a clamping claw 12 is pivotally connected to a standing tube 13 within the coil 11. So that the clamping claw 12 can be clamped inwardly or expanded outwardly according to the rise and fall of the standing tube 13 within the coil 11, and the claw crane is primarily connected to the terminals of a winding wire 14 of a power supply through both ends of the coil 11. When the coil 11 is powered onto generate a magnetic field, the standing tube 13 in connection with the clamping claw 12 is caused to rise, allowing the clamping claw 12 to clamp inward. Furthermore, the both ends of the coil 11 are respectively connected with the terminals of the winding wire 14, coupling the coil 11 and the winding wire 14 together (as shown in FIG. 1). The connection is then wrapped and sealed with an insulating tape 15, which is positioned beside the coil 11 to conceal and protect the coil 11 of the claw crane.

However, when the coil 11, winding wire 14 or clamping claw 12 becomes damaged, or requires maintenance and replacement, the process is time-consuming and labor-intensive. Since the coil 11 is sealed and hidden, and the connections between the coil 11 and the winding wire 14 are wrapped in insulating tape 15, technicians must remove the tape before performing maintenance. After completing the repairs or replacements, the insulating tape 15 must be reapplied to reseal and conceal the coil 11, resulting in unnecessary waste and inefficiency.

SUMMARY OF THE INVENTION

To overcome the disadvantages mentioned above, the present invention is proposed.

An object of the present invention is to provide a claw crane with convenient assembly and disassembly.

To achieve this object, the present invention proposes a claw crane structure that includes a main body and a coil being provided inside. The bottom of the main body is provided with a clamping claw pivotally coupled to a standing tube extending inside the coil. This allows the clamping claw to clamp inward or expand outward based on the rise and fall of the standing tube inside the coil. According to the present invention, a PC circuit board is provided on the main body, positioned above the coil. Both ends of the coil are in electrical connection with two coil contacts provided on the PC circuit board. Additionally, the main body includes a winding wire for supplying electrical energy, with two terminals similarly connected to two winding wire contacts provided on the PC circuit board. Each pair of the coil contacts and winding wire contacts are electrically connected, allowing power from the winding wire to pass through the PC circuit board to energize the coil and generate a magnetic field.

With the above structure, the claw crane structure provides convenient assembly, maintenance and replacement, while reducing costs.

DETAILED DESCRIPTION OF THE PREFERRED EMBODIMENTS

Figure 1:
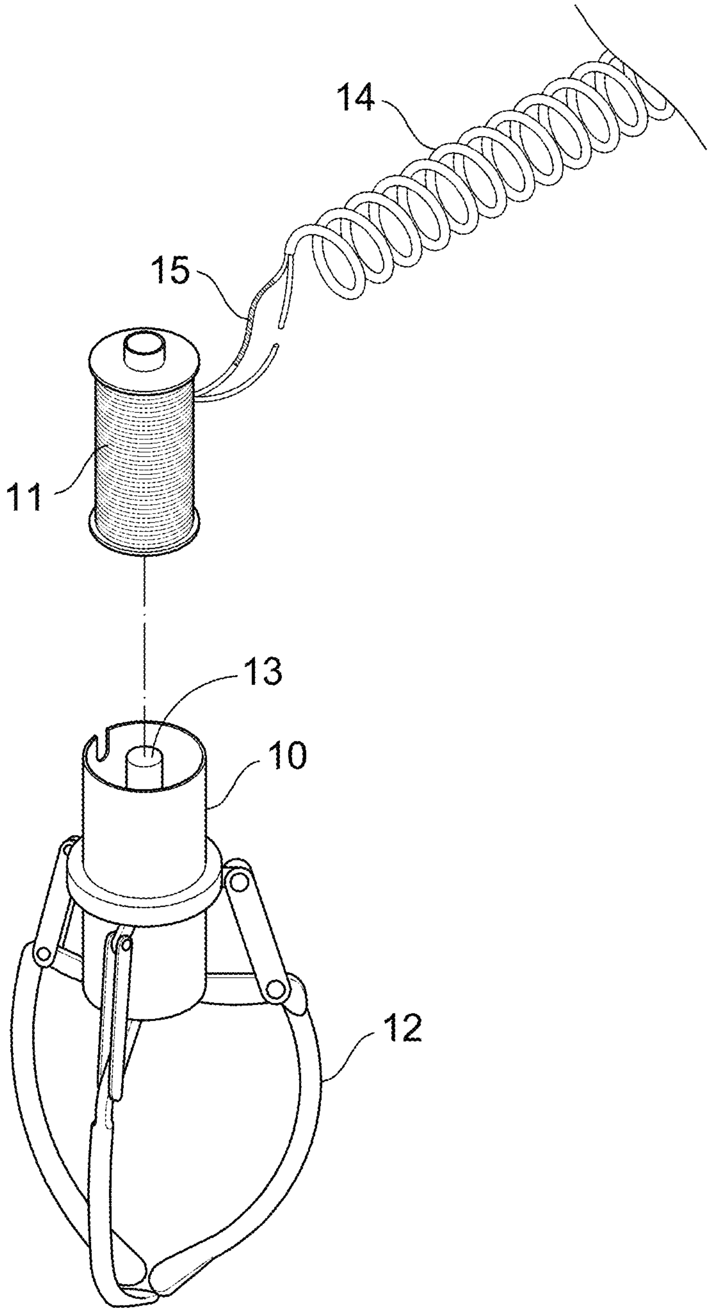
FIG. 1 PRIOR ART
FIG. 1 is a schematically exploded view of a conventional claw crane.
Figure 2:
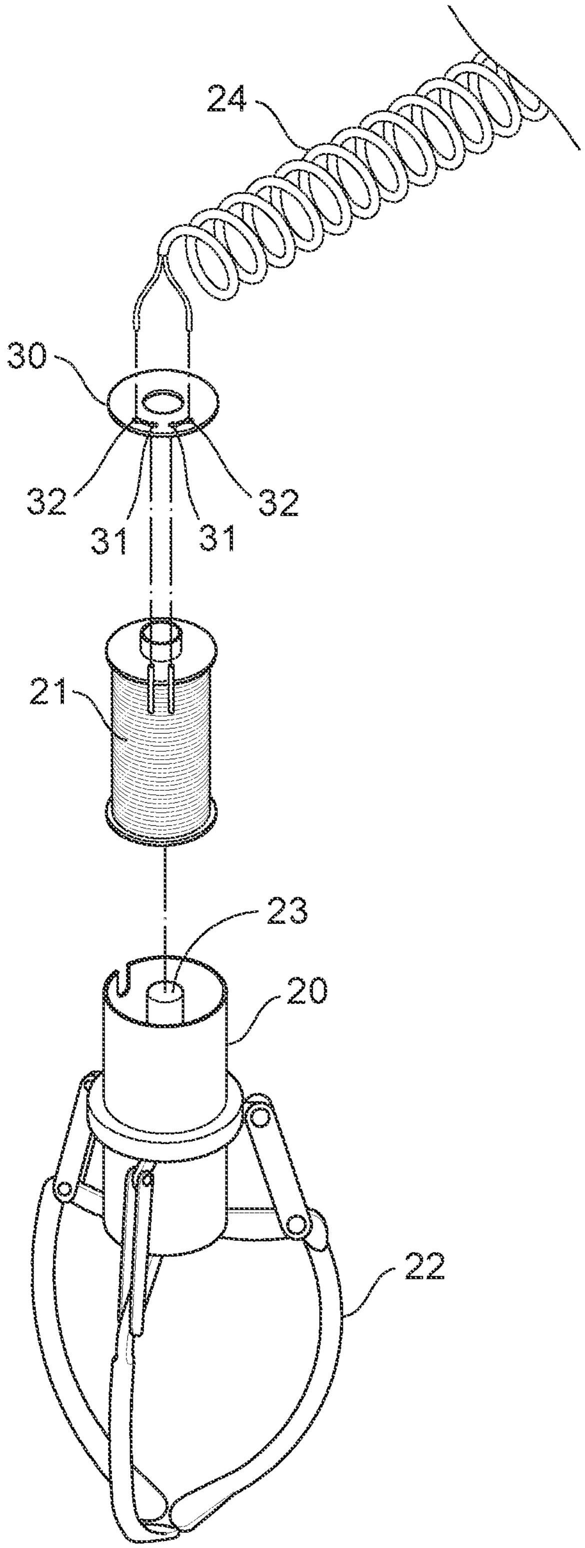
FIG. 2 is an exploded view of the present invention.
Figure 3:
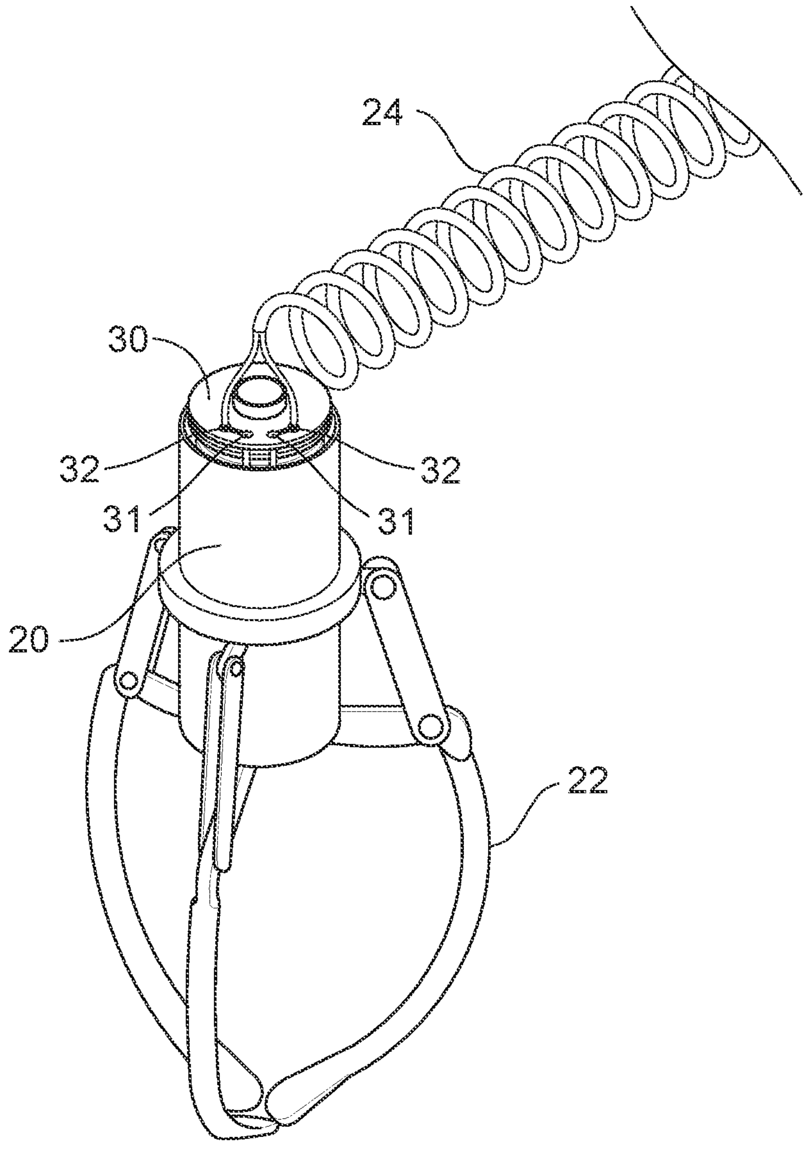
FIG. 3 is a perspective view of the present invention.

Referring to FIGS. 2 and 3, a claw crane structure of the present invention includes a main body 20 with a coil 21 configured inside. The bottom of the main body 20 is provided with a clamping claw 22 pivotally coupled to a standing tube 23 extending into the coil 21, allowing the clamping claw 22 to clamp inward or expand outward depending on the rise and fall of the standing tube 23 within the coil 21. The main body 20 is provided with a PC circuit board 30 positioned above the coil 21. Both ends of the coil 21 are respectively in electrical connection with two coil contacts 31 configured on the PC circuit board 30. The main body 20 also includes a winding wire 24 providing electrical energy, with its two terminals connected to the two winding wire contacts 32 provided on the PC circuit board 32. Each pair of the coil contacts 31 and winding wire contacts 32 are electrically connected, thereby enabling the winding wire 24 to supply power to the coil 21 through the PC circuit board 30 to generate a magnetic field.

As mentioned above, in a preferred embodiment, both ends of the coil 21 is electrically connected with the lower side of the PC circuit board 30, while the terminals of the winding wire 22 connect to the upper side of the PC circuit board 30.

With the above structure, the present invention does not need an insulating tape to join the coil 21 and the terminals of the winding wire 24 thereby providing easy assembly and rapid maintenance. Since both ends of the coil 21 are electrically connected with the PC circuit board 30 and the terminals of the winding wire 24 are also electrically connected with the PC circuit board 30. In addition, since the PC circuit board 30 provided on the main body 20 is relatively positioned above the coil 21, the PC circuit board will not be covered and sealed, so that when the coil 21 and the terminal of the winding wire 22 is required to be maintained and replaced, personnel can directly disconnect, short circuit or reconnect the connection between the coil 21, winding wire 24 and PC circuit board 30 to carry out the maintenance, replacement without removing an insulating tape or a sealing layer outside the coil 21, resulting in time and cost savings.

Furthermore, the PC circuit board 30 includes a temperature sensor (not shown in the figures), and the working pins of the temperature sensor are electrically connected with the coil contacts 31 and winding wire contacts 32 configured on the PC circuit board 30, which can be used to detect the working temperature of the coil 21 and PC circuit board 30, thereby enabling the temperature sensor to control the conduction or short-circuit of the coil 21 and winding wire 24 and preventing the coil 21 from being damaged due to overheating. In a preferred embodiment, the temperature sensor is attached to the tube wall around the coil 21, so as to enhance temperature sensing accuracy and responsiveness.

I claim:

1. A claw crane structure, comprising;

a main body;

a coil housed within the main body;

a bottom of said main body being provided with a clamping claw pivotally coupled to a standing tube, wherein said standing tuble extends inside said coil, allowing said clamping claw to move inward or outward based on vertical movement of said standing tube within said coil;

a PC circuit board positioned above said coil and mounted on said main body;

two coil contacts provided on said PC circuit board, each electrically connected to a respective end of said coil;

a winding wire supplying electrical energy, having two terminals electrically connected to corresponding winding wire contacts provided on said PC circuit board;

each of said coil contacts being electrically connected to a corresponding winding wire contact, enabling electrical energy from said winding wire to be transmitted through said PC circuit board to said coil, thereby generating a magnetic field.

2. The structure according to claim 1, wherein said both ends of said coil are electrically connected with a lower side of said PC circuit board, and said terminals of said winding wire are electrically connected with an upper side of said PC circuit board.

* * * * *